United States Patent
Ishii (10) Patent No.: US 10,732,907 B2
(45) Date of Patent: Aug. 4, 2020

(54) PRINTER

(71) Applicant: BROTHER KOGYO KABUSHIKI KAISHA, Aichi-ken (JP)

(72) Inventor: Hidekazu Ishii, Aichi-ken (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/356,547

(22) Filed: Mar. 18, 2019

(65) Prior Publication Data
US 2019/0369925 A1    Dec. 5, 2019

(30) Foreign Application Priority Data

Jun. 1, 2018   (JP) .................................. 2018-106126

(51) Int. Cl.
    *G06F 3/12*      (2006.01)
    *G01G 23/18*     (2006.01)
    *H04N 1/00*      (2006.01)

(52) U.S. Cl.
    CPC ........... *G06F 3/1205* (2013.01); *G01G 23/18* (2013.01); *G06F 3/1243* (2013.01); *G06F 3/1284* (2013.01); *H04N 1/00323* (2013.01)

(58) Field of Classification Search
    CPC .... G06F 3/1205; G06F 3/1243; G06F 3/1284; G01G 23/18; H04N 1/00323
    See application file for complete search history.

(56) References Cited

U.S. PATENT DOCUMENTS

| 4,901,237 A * | 2/1990 | Hikita | G01G 19/4144 177/25.15 |
| 7,183,506 B2 * | 2/2007 | Teraoka | G01G 19/415 177/2 |
| 8,249,928 B2 * | 8/2012 | Schuller | G01G 19/4144 705/14.38 |
| 8,432,567 B2 * | 4/2013 | Eberhardt, Jr. | G06K 17/0025 235/375 |

(Continued)

FOREIGN PATENT DOCUMENTS

| JP | S51-142365 A | 12/1976 |
| JP | S62-239024 A | 10/1987 |

(Continued)

*Primary Examiner* — Neil R McLean
(74) *Attorney, Agent, or Firm* — Kenealy Vaidya LLP (57) ABSTRACT

A printer connectable to a weight measuring apparatus includes: a head configured to perform printing on a print medium; a controller; a memory; and an operation part. The controller executes: an identifying processing of identifying the weight measuring apparatus based on identification information; a first storing processing of storing, in the memory, first data transmitted from the weight measuring apparatus in a first loading state; a second storing processing of storing, in the memory, second data transmitted from the weight measuring apparatus in a second loading state; a data specifying processing of specifying, as weight data areas, data areas having mutually different values and included in code strings constructing the first data and the second data, respectively; and a registering processing of registering, in the memory, the identification information and the weight data areas while associating the identification information and the weight data areas with each other.

6 Claims, 11 Drawing Sheets

(56) References Cited

U.S. PATENT DOCUMENTS

2012/0043375 A1* 2/2012 Ueda ................. G01G 19/4144
235/3
2013/0201502 A1* 8/2013 Rajendraprasad ..........................
H04N 1/00323
358/1.13

FOREIGN PATENT DOCUMENTS

| JP | S63-14289 B2 | 3/1988 |
| JP | H09-58644 A | 3/1997 |

* cited by examiner

PRINTER

CROSS REFERENCE TO RELATED APPLICATION

The present application claims priority from Japanese Patent Application No. 2018-106126 filed on Jun. 1, 2018 the disclosure of which is incorporated herein by reference in its entirety.

BACKGROUND

Field of the Invention

The present disclosure relates to a printer configured to prepare a printed matter based on data transmitted from a weight measuring apparatus.

There is suggested a configuration wherein, for example, the weight of an article is measured by a scale (weighting) part (section); and data, of the article, including the measured weight thereof is printed on a label based on any one of a plurality of label formats previously stored (see, for example, Japanese Patent Application Laid-open No. S62-239024).

SUMMARY

There is known a technique wherein a weight measuring apparatus, which measures the weight of a measurement object (object to be measured), inputs data including weight data corresponding to the measured weight to a printer; and the printer obtains the weight data included in the data and performs printing. Since there are many kinds of the weight measuring apparatuses, there is such a case that the kind of information included in the data inputted to the printer might be mutually different among the weight measuring apparatuses. Due to this, with respect to data inputted from a weight measuring apparatus of which kind is not registered in the printer, it is not possible to distinguish as to which part of the inputted data corresponds to the weight data, which in turn makes it impossible to perform the printing processing for such data.

An object of the present disclosure is to provide a printer capable of executing, in an ensured manner, a desired printing with respect to a value of weight (weight value) measured by a non-registered weight measuring apparatus.

According to an aspect of the present disclosure, there is provided a printer connectable to a weight measuring apparatus, the weight measuring apparatus being configured to measure weight of a measurement object (object to be measured) and to output data including weight data corresponding to the measured weight, the printer including: a head configured to perform printing on a print medium; a controller; a memory; and an operation part, wherein the controller is configure to execute: an identifying processing of obtaining identification information from the weight measuring apparatus to which the printer is connected, and of identifying the weight measuring apparatus to which the printer is connected, based on the identification information, a first storing processing of storing, in the memory, first data transmitted from the weight measuring apparatus in a first loading state, the first loading state being a state before a first operation is performed with respect to the operation part; a second storing processing of storing, in the memory, second data transmitted from the weight measuring apparatus in a second loading state, the second loading state being a state having a gain or loss of a predetermined weight from the first loading state after the first operation has been performed with respect to the operation part; a data specifying processing of specifying, as weight data areas, data areas which are included in code strings constructing the first data and the second data, respectively, and which have mutually different values; and a registering processing of registering, in the memory, the identification information obtained in the identifying processing and the weight data areas specified in the data specifying processing while associating the identification information and the weight data areas with each other.

The printer according to the aspect of the present disclosure is connected to the weight measuring apparatus configured to measure the weight of the measurement object and to output data including the weight data corresponding to the measured weight. Accordingly, the printer is capable of performing printing corresponding to a result of the weight measurement by the weight measuring apparatus. Since there is a variety of kinds of the weight measuring apparatuses, there is such a case that the kind of information included in the data outputted therefrom might be mutually different among the variety of kinds of weight measuring apparatuses.

In view of this situation, the printer according to the aspect of the present disclosure causes the controller to execute the first storing processing, the second storing processing and the data specifying processing. Namely, after the weight measuring apparatus is connected to the printer, in the first storing processing, the printer stores, in the memory, the data (first data) transmitted from the weight measuring apparatus in the first loading state which is a state before a predetermined processing (first processing) is performed with respect to the operation part of the weight measuring apparatus. Then, in a case that the weight measuring apparatus is in the second loading state, which has the gain or loss of the predetermined weight (predetermined weight gain or loss) with respect to the first loading state, brought about by a handling by a user and which is provided after the first operation has been performed with respect to the operation part, the printer stores, in the memory, the data (second data) transmitted from the weight measuring apparatus in the second loading state, by the second storing processing.

In this situation, the different parts (different values) between the first data corresponding to the first loading state and the second data corresponding to the second loading state represent the difference between the first loading state and the second loading state, namely, represents the predetermined weight. Accordingly, in the data specifying processing, the printer specifies, as the weight data areas, data areas which are included in code strings constructing the first data and the second data, respectively, and which have mutually different values. Further, the weight data areas thus specified are unique to the kind of the weight measuring apparatus which is currently (at the time of the weight measurement) connected to the printer. Accordingly, in the registering processing, the printer registers, in the memory, the identification information (obtained in the identifying processing) and the weight data areas (specified in the data specifying processing) while associating the identification information and the weight data areas with each other.

With this, in a case that the weight measuring apparatus of the above-described kind is connected to the printer thereafter, the printer is capable of obtaining the weight value of the measurement object by appropriately interpreting the data of the weight data areas (weight data) among the data inputted to the printer from the weight measuring apparatus. As a result, the printer is capable of performing, in an ensured manner, a desired printing even with the weight value measured by a non-registered weight measuring apparatus.

BRIEF DESCRIPTION OF THE DRAWINGS

FIGS. 3A and 3B are views depicting an example of data construction and data format information of each of negotiation data and weight measuring data, wherein FIG. 3A depicts a "registered" case and FIG. 3B depicts a "non-registered" case.

DESCRIPTION OF THE EMBODIMENTS

In the following, an embodiment of the present disclosure will be explained, with reference to the drawings.

In the embodiment, an explanation will be given regarding a case of printing weight data outputted by a weight measuring apparatus through a weight information outputting processing which is executed by a label preparing apparatus, or a case of transmitting the weight data to a mobile terminal.

<Schematic Configuration of Weight Information Outputting System>

Figure 1:
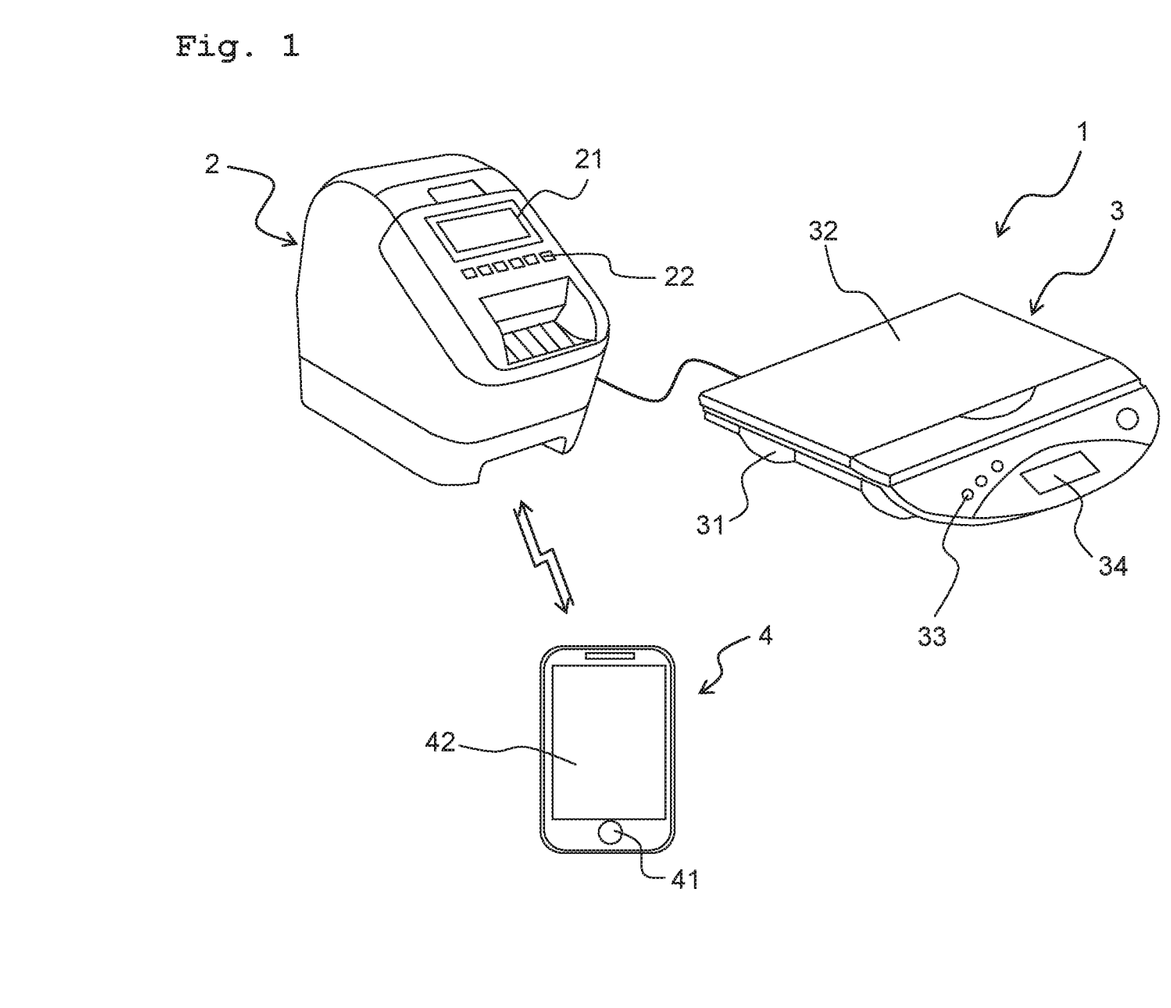
FIG. 1 is a schematic view depicting a weight information outputting system provided with a printer according to an embodiment of the present disclosure.

As depicted in FIG. 1, a weight information outputting system 1 is provided with a label printer 2, a weight measuring apparatus 3, and a mobile terminal 4. The weight measuring apparatus 3 is connected with respect to the label printer 2, via a wired communication such as USB, etc., such that information can be transmitted and received between the weight measuring apparatus 3 and the label printer 2. The mobile terminal 4 is connected with respect to the label printer 2, via a wireless communication such as Wi-Fi, etc., such that information can be transmitted and received between the mobile terminal 4 and the label printer 2.

The weight measuring apparatus 3 has: an apparatus body 31; a loading plate 32 having a flat-plate shape and arranged at a position above the apparatus body 31; an operating button 33 operable by a user and provided on a front side relative to the apparatus body 31; and a display panel 34 provided, for example, with a liquid crystal display, etc. In a case that the user places (loads) a measurement object (object to be measured; not specifically illustrated in the drawings) on the loading plate 32, the weight measuring apparatus 3 automatically measures the weight of the measurement object, and transmits the result of measurement to the label printer 2, as weight measuring data (to be described later on).

The mobile terminal 4 has: an operating button 41 operable by a user; and a touch panel section 42 provided, for example, with a liquid crystal display, etc. In a case that the mobile terminal 4 receives a data signal regarding the weight of the measurement object (corresponding to a weight signal), the mobile terminal 4 displays data regarding the weight in the touch panel section 42, in a predetermined display mode.

The label printer 2 (corresponding to a printer) is provided with a display 21 constructed, for example, of a liquid crystal display and which is configured to display the weight measuring data, a variety of kinds of information, or a variety of kinds of messages; and an operation part 22 including a plurality of buttons which can be pressed down and be operated by the user. In a case that the label printer 2 receives the weight measuring data from the weight measuring apparatus 3, the label printer 2 itself prints the content of the weight measuring data so as to prepare a print label (not specifically depicted in the drawings), or transmits a data signal regarding the weight to the mobile terminal 4 and causes the touch panel section 42 of the mobile terminal 4 to display the content of the data signal regarding the weight. Namely, in the weight information outputting system 1, the label printer 2 has a function as a host apparatus in a network wherein the weight measuring apparatus 3 is an information inputting terminal and the mobile terminal 4 is an outputting terminal.

<Functional Configuration of Label Printer>

Figure 2:
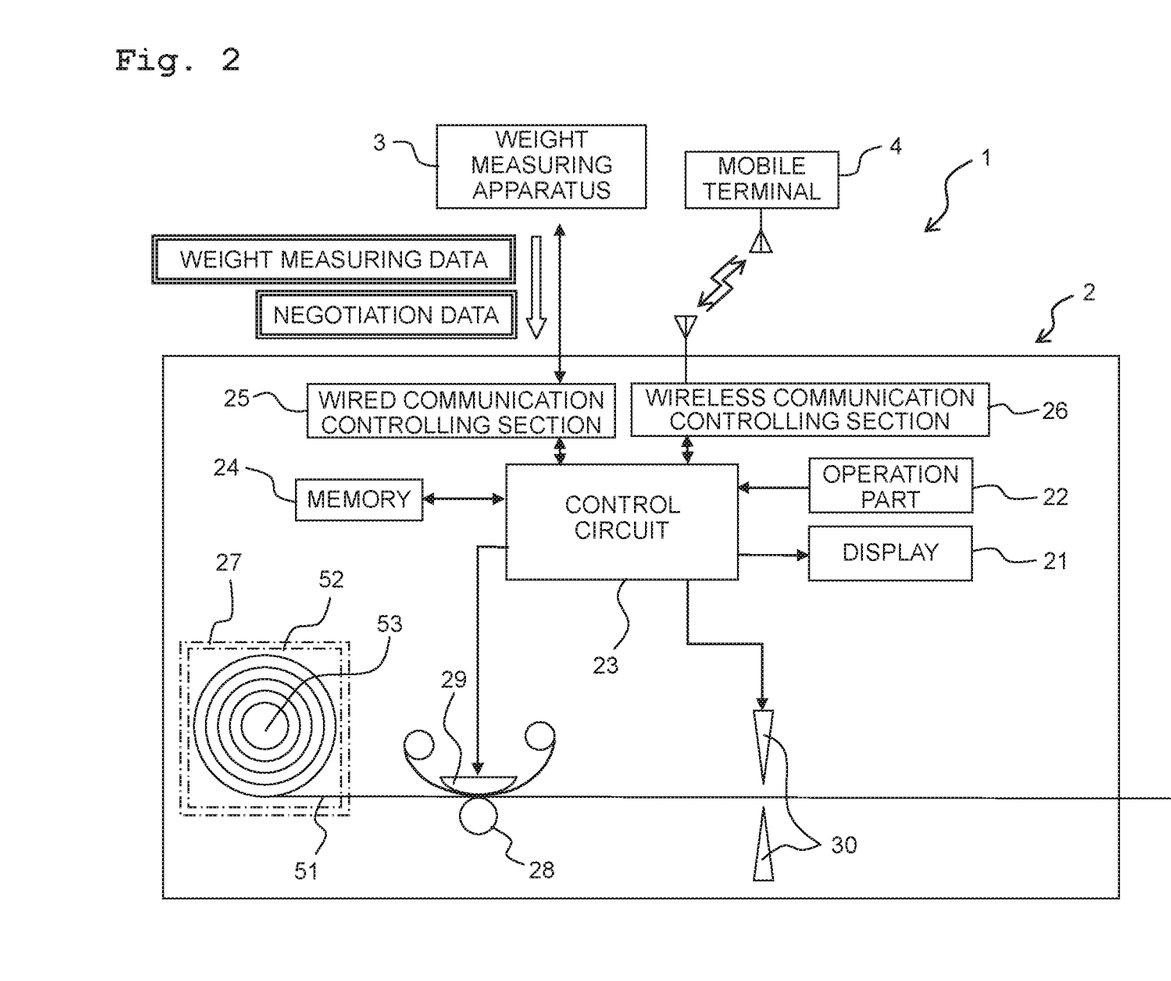
FIG. 2 is a functional block diagram depicting the functional configuration of a label preparing apparatus.

An explanation will be given about the functional configuration of the above-described label printer 2, with reference to FIG. 2. As depicted in FIG. 2, the label printer 2 has a control circuit 23, a memory 24 storing a variety of kinds of information, a wired communication controlling section 25, a wireless communication controlling section 26, the display 21, the operation part 22, a cartridge holder 27, a conveying device 28, a printing head 29 and a cutter 30.

The wired communication controlling section 25 controls information communication (telecommunication) performed with respect to the weight measuring apparatus 3 which is wire-connected to the label printer 2 as described above. Specifically, in a case that the power is supplied to both of the label printer 2 and the weight measuring apparatus 3 in a state that the weight measuring apparatus 3 is connected with respect to the label printer 2, the wired communication controlling section 25 firstly performs negotiation communication with respect to the weight measuring apparatus 3. In this negotiation communication, both the apparatuses (namely, the label printer 2 and the weight measuring apparatus 3) transmit and receive, with respect to each other, negotiation data including an vendor ID and a model ID (which will be described later on) so as to establish a state wherein the information can be transmitted and received with respect to each other. Then, after both the apparatuses are allowed to be in the state of capable of transmitting and receiving information with respect to each other through the negotiation communication, the label printer 2 receives the weight measuring data transmitted by the weight measuring apparatus 3 via the wired communication controlling section 25.

The wireless communication controlling section 26 controls the information communication performed with respect to the mobile terminal 4 which is wirelessly connected to the label printer 2 as described above.

Figure 7A:
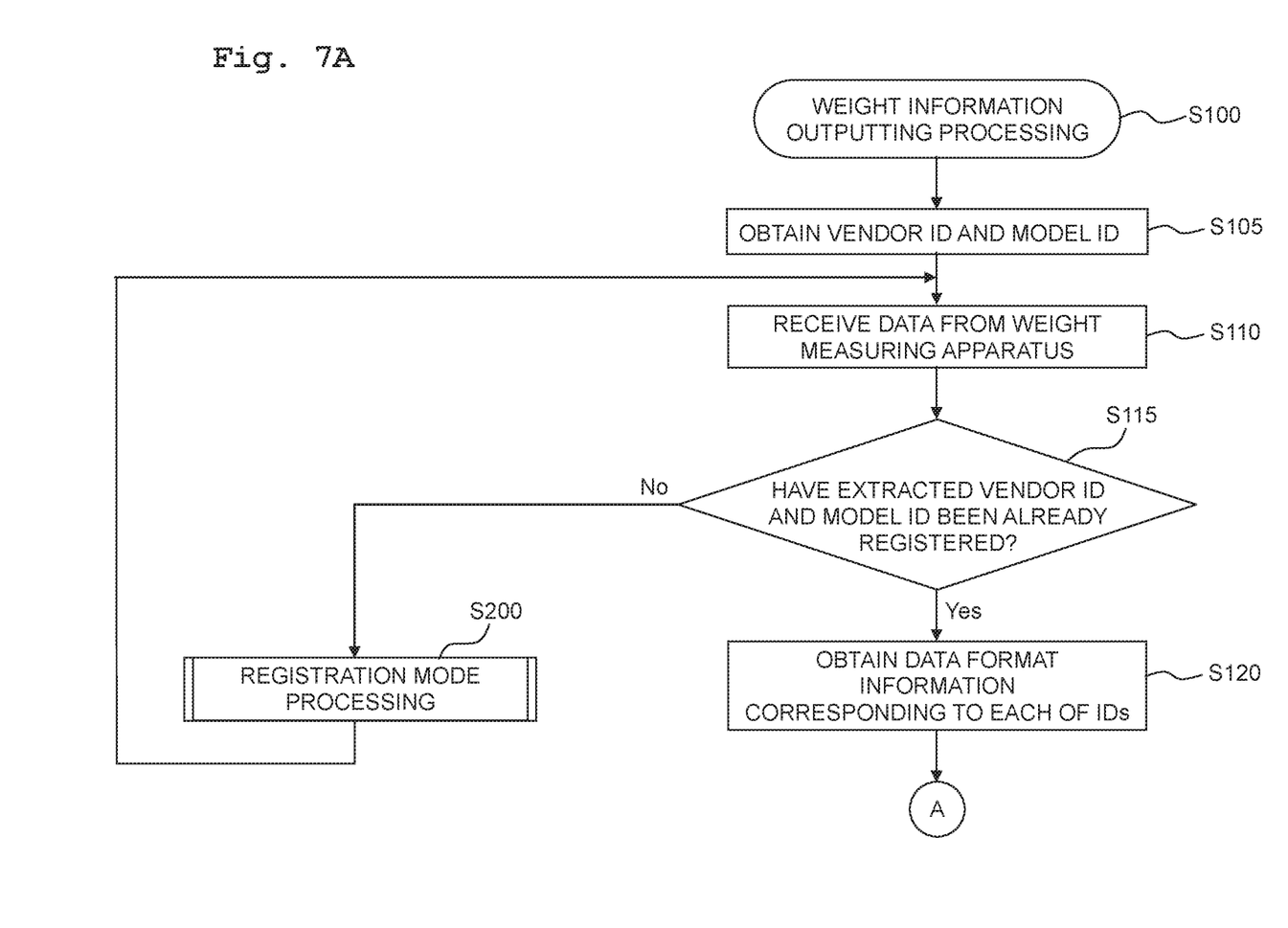
FIGS. 7A and 7B are a flowchart depicting a weight information outputting processing executed by a control circuit of a label printer.
Figure 7B:
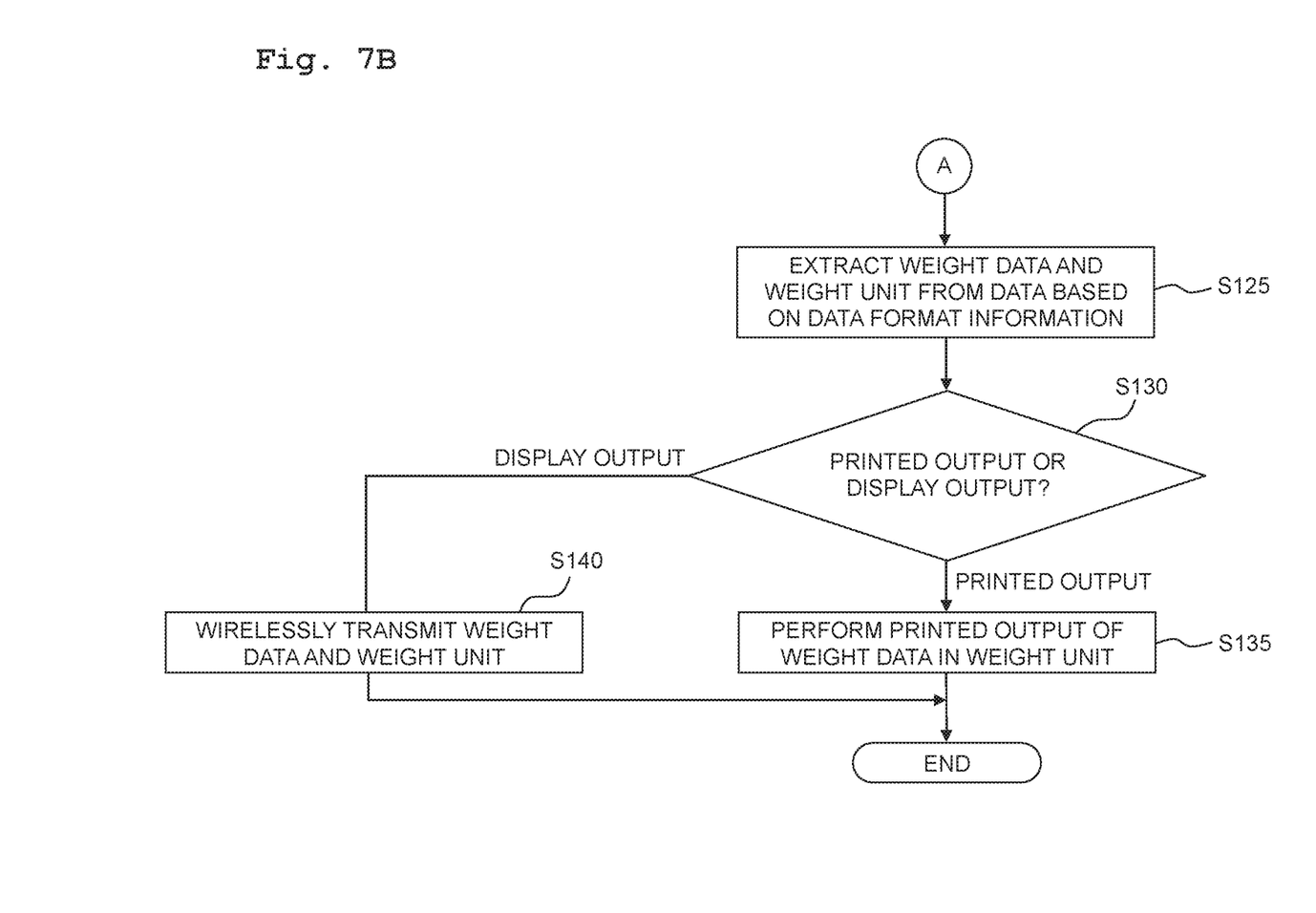
Figure 8A:
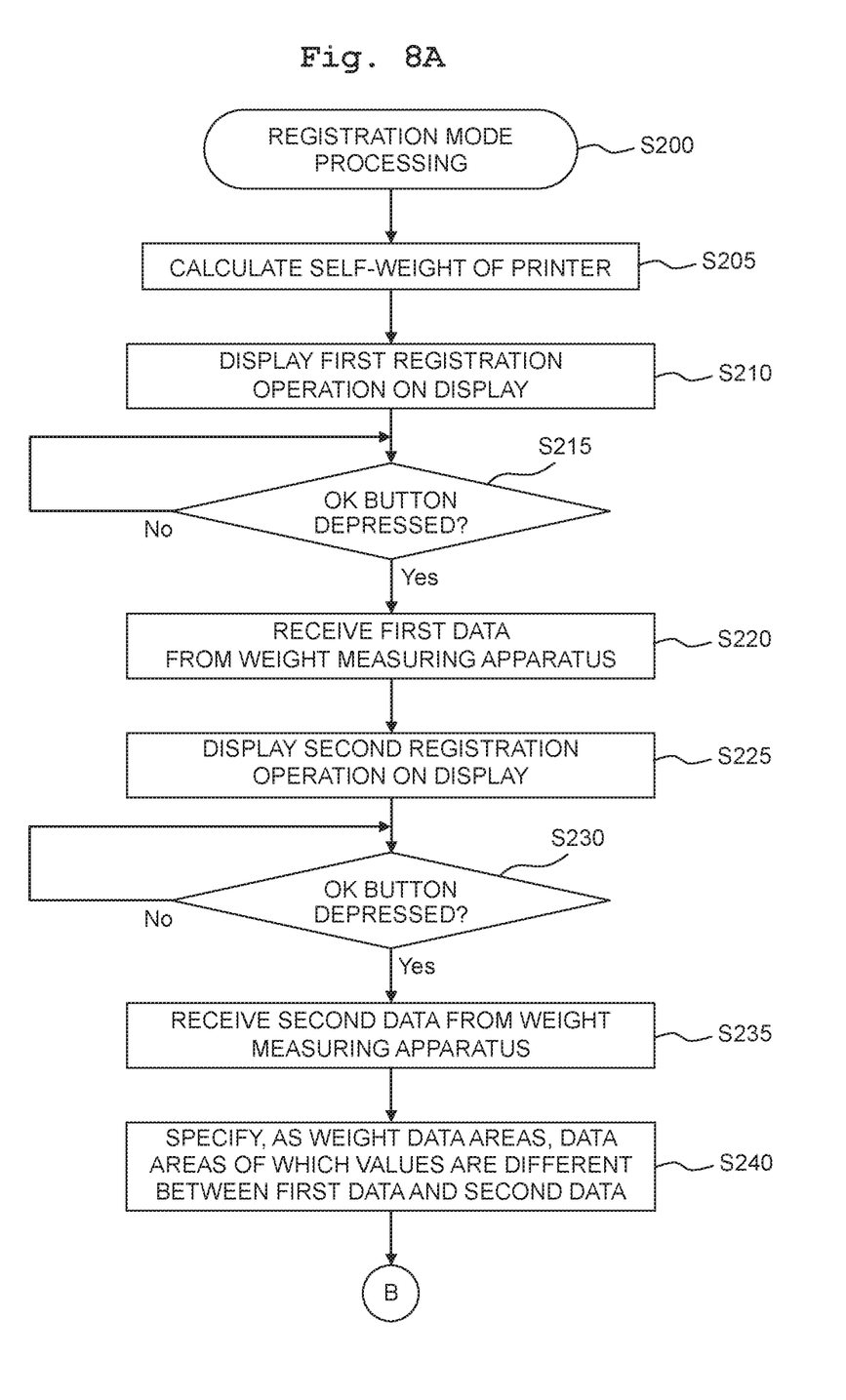
FIGS. 8A and 8B are a flowchart depicting a registration mode processing executed by the control circuit of the label printer.
Figure 8B:
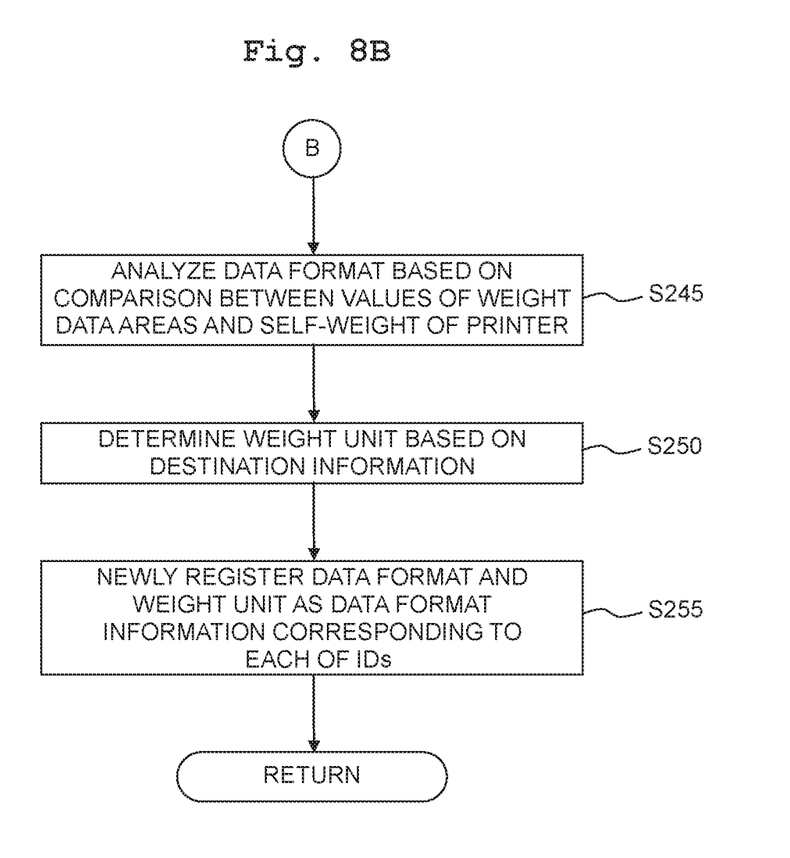

The control circuit 23 (corresponding to a controller) is provided with non-illustrated CPU, RAM and ROM. The control circuit 23 executes a variety of kinds of programs previously stored in the ROM, while utilizing a temporary storing function of the RAM. By doing so, the control circuit 23 controls the entirety of the label printer 2. The variety of kinds of programs includes programs for executing procedures (to be described later on) as depicted in FIGS. 7 and 8. Note that the negotiation data received from the weight measuring apparatus 3 is stored in the RAM.

The memory 24 is constructed of a non-volatile memory in which memory content can be added and deleted, such as, for example, a flash memory, etc. The memory 24 is configured to store destination data and data format information for analyzing the weight measuring data (which will be described later on).

The cartridge holder 27 is configured such that a cartridge 52 capable of supplying a tape 51 therefrom (corresponding to a print medium) is detachably attached to the cartridge holder 27. The cartridge 52 is provided with a tape roll 53 (which originally has a spiral shape but depicted as simplified with a concentric shape) having the tape 51 wound around a non-illustrated reel member.

The conveying device 28 is provided so as to face (to be opposite to) the printing head 29. The conveying device 28 is controlled by the control circuit 23 so as to convey the tape 51 which is fed out from the tape roll 53 of the cartridge 52.

The printing head 29 is controlled by the control circuit 23 so as to perform a desired printing with respect to the tape 51 fed out from the tape roller 53 and conveyed by the conveying device 28.

The cutter 30 is controlled by the control circuit 23 so as to cut the tape 51 for which the printing by the printing head 29 has been ended, and to provide a print label.

The display 21 displays a variety of kinds of information including the weight measuring data and an operation screen, etc.

The operation part 22 receives a variety of kinds of operations, by a depressing operation performed by the user.

In the label printer 2 according to the above-described embodiment, even in a case that the data format information corresponding to the kind (model) of the weight measuring apparatus 3, which is connected with respect to the label printer 2, is not registered in the memory 24, the label printer 2 is capable of analyzing the data format of the received weight measuring data and of newly registering data format information corresponding to the analyzed data format. The details of this will be explained in a step by step manner with reference to FIGS. 3 to 8.

<Weight Measuring Data and Data Format Information>

An explanation will be given about the weight measuring data and the data format information in the present embodiment, with reference to FIGS. 3A and 3B. Firstly, in an example depicted in FIG. 3A, when the negotiation communication is performed, the negotiation data in a time-series binary data format with multiple bytes is received from the weight measuring apparatus 3. Further, when the weight measurement is performed, the weight measuring data in a time-series binary data format with the total of 6 bytes is received from the weight measuring apparatus 3. Note that in the drawing, the binary data of each of the bytes is represented in hexadecimal: "x **".

Here, in general, regarding a weight measuring apparatus 3 of any model manufactured by any vendor (production company), a vendor ID as identification information of the vendor and a model ID as identification information of the model of the weight measuring apparatus 3 are included respectively in predetermined data areas (predetermined byte positions: k-th byte to k+3 byte in the depicted example) which are outputted in the negotiation data commonly among weight measuring apparatuses of any model and vendors. Further, in the weight measuring data, it is arbitrary as to at which information is allocated at which byte position (data area) for each of the vendors or for each of the models. Furthermore, the data length (byte number) of the entire weight measuring data is also arbitrary. Moreover, such weight measuring data is transmitted from the weight measuring apparatus 3 continuously and unilaterally at a sufficiently short cycle (for example, 100 ms) after a state in which the information can be transmitted and received has been established through the above-described negotiation communication.

Figure 3A:
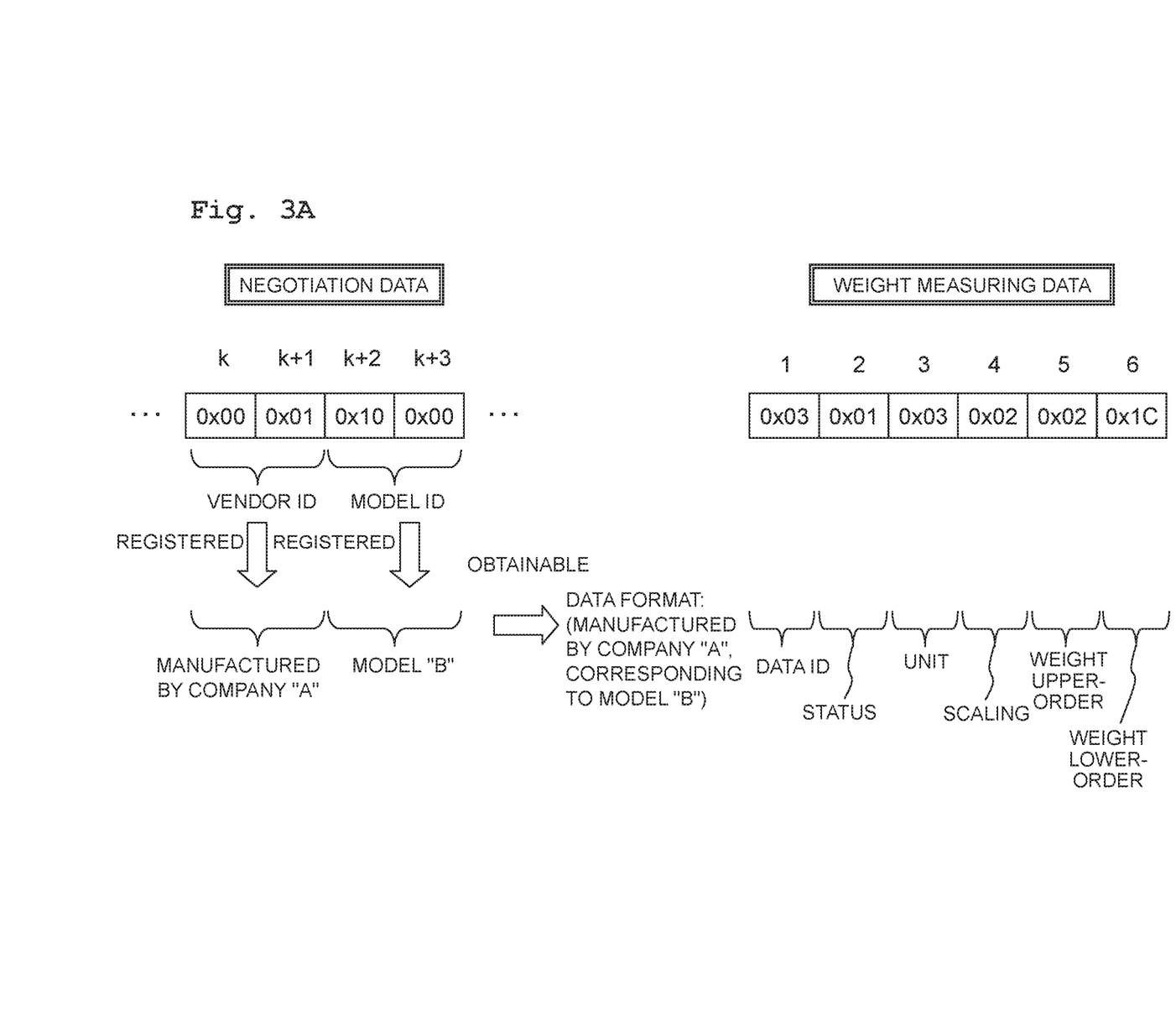
Figure 3B:
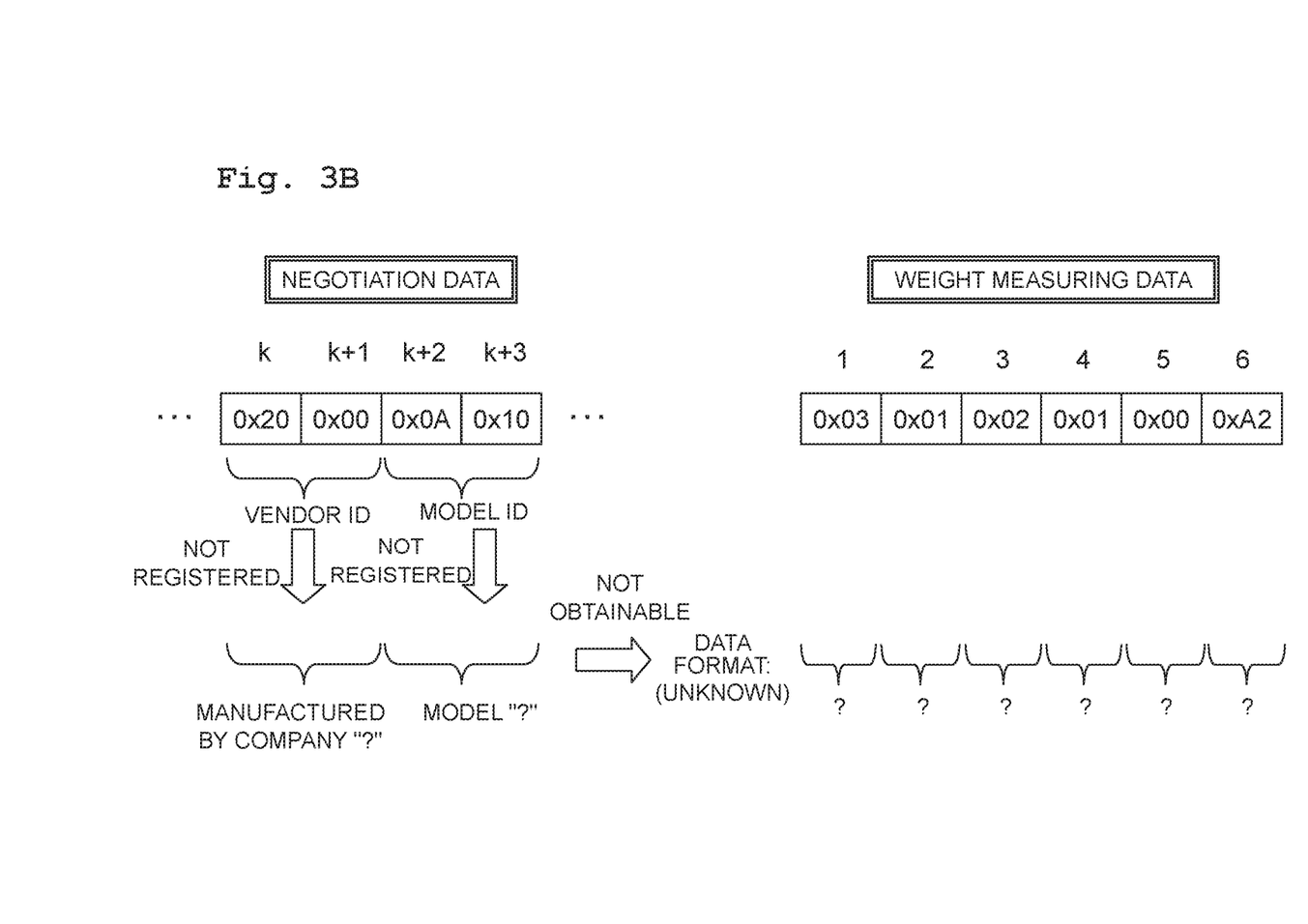

In the example depicted in FIG. 3A, data ID information is allocated to a first byte, status information is allocated to a second byte, unit information is allocated to a third byte, scaling information is added to a fourth byte, weight upper-order information is allocated to a fifth byte and weight lower-order information is allocated to a sixth byte of th weight measuring data. The data ID information is identification information of the weight measuring data. The status information is information indicating, for example, a variety of kinds of states of the weight measuring apparatus 3 such as a state thereof during performing an operation of measurement, a state thereof after completion of the measurement, a state thereof while being in abeyance of the measurement (while not performing the operation of measurement), etc. The unit information is information indicating the unit of outputted weight value (such as "g: gram", "lb.: pound", etc.). The scaling information is information indicating, for example, that in a case that the unit information is "g", whether a value, which is represented by below-described weight upper-order and weight lower-order (value of the weight or weight value), corresponds to the scale of "g" or the scale of "kg", etc. The information regarding the weight upper-order and the information regarding the weight lower-order are information regarding the upper-order byte and information regarding the lower-order byte, respectively, (namely, 2-byte notation) of the measured weight value.

The content of the information allocated to each of the bytes in the weight measuring data as described above, namely the information representing the data construction is referred to as data format information in the present embodiment. Data format information corresponding to variety of kinds of weight measuring apparatuses 3 is stored in advance in the memory 24 of the label printer 2 (for example, is registered in a data base form). The control circuit 23 of the label printer 2 is capable of identifying the vendor ID and the model ID from the received negotiation data, and of obtaining the data format information corresponding thereto from the memory 24. Further, by referring to the obtained data format information, the control circuit 23 is capable of extracting necessary information from the received weight measuring data. For example, in the example depicted in FIG. 3A, the control circuit 23 is capable of extracting the weight value ("0x 021C" in the depicted example) from the 5th and 6th bytes of the weight measuring data and is capable of extracting the unit information ("0x 03"of the depicted information) from the 3rd byte, of the weight measuring data, based on the data format information.

However, a large number of kinds of the weight measurement apparatus are distributed and used as the weight measurement apparatus 3; there is such a case that a connected weight measurement apparatus 3 does not correspond to the label printer 2. Specifically, there is such a case that the data format information corresponding to the content (the two IDs) of the negotiation data transmitted by the weight measuring apparatus 3 is not registered in the memory 24 of the label printer 2 which has received the negotiation data. In such a case, as depicted in FIG. 3B, the data construction (kind of data) in the received weight measuring data is unknown; in particular, it is not possible to distinguish as to extract, from which data area, the weight data corresponding to the weight value, thereby making it impossible for the label printer 2 to output the weight information.

As described above, in a case that a connection with respect to a non-registered weight measuring apparatus 3 is detected, namely, in a case that determination is made that the data format information corresponding to the vendor ID and the model ID of the received negotiation data is not registered, the label printer 2 of the present embodiment automatically execute a registration mode for newly generating data format information corresponding to the vendor ID and the model ID of the received negotiation data and for registering the newly generated data format information.

<Registration Mode>

Figure 4:
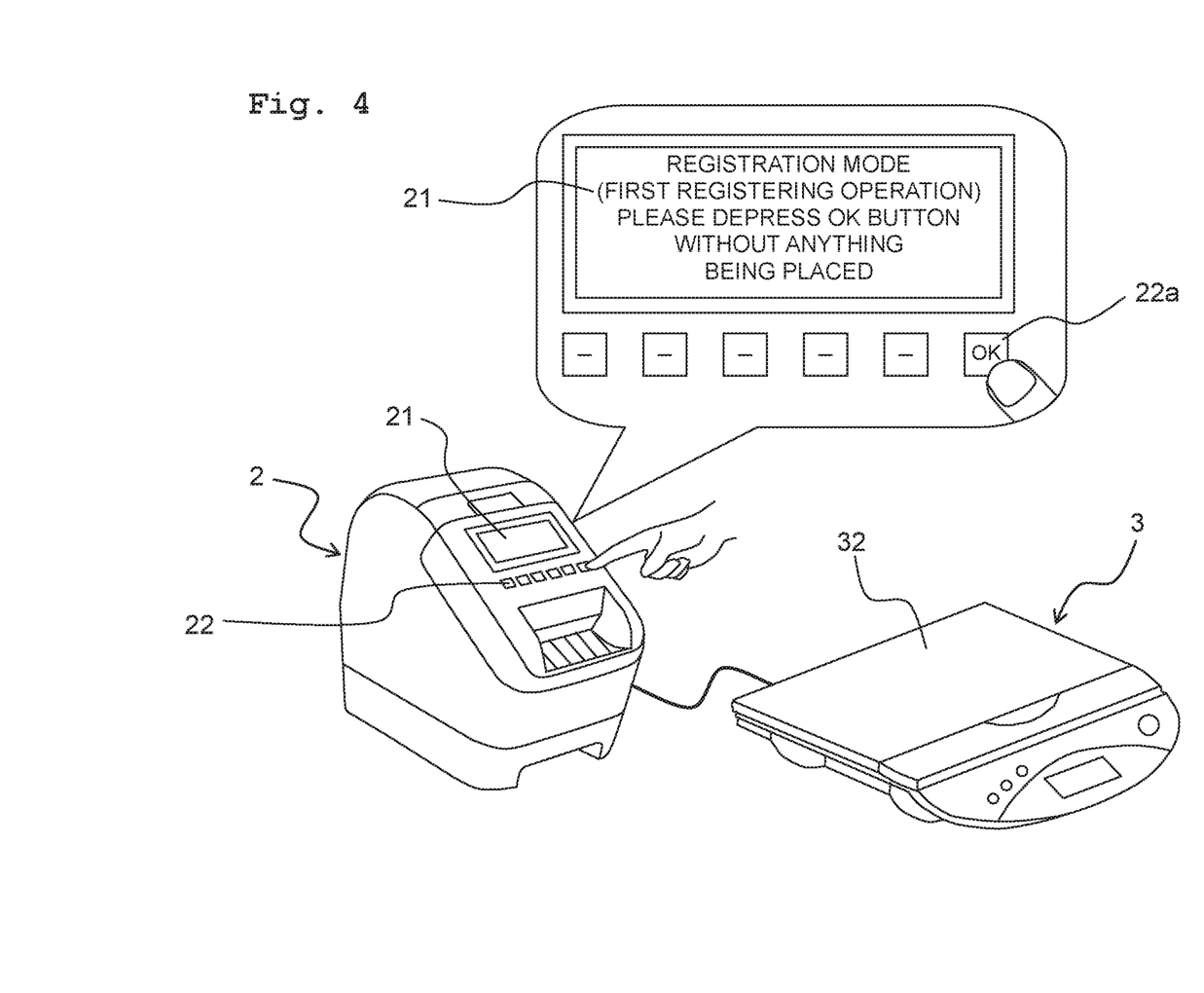
FIG. 4 is a view depicting the content of display by a display and a loading state when a first registering operation is performed.

In the registration mode, the label printer 2 of the present embodiment requires a user to execute a registering operation two times in total. At first, in a case that the execution of the registration mode is started, the label printer 2 causes, as depicted in FIG. 4, the display 21 to perform display (corresponding to a first display) such that the user executes a first registering operation (corresponding to a first operation). The first registering operation is an operation in which the operation part 22 (an OK button 22a in the depicted example) is pressed downward in a state that nothing is loaded on the loading plate 32 of the weight measuring apparatus 3 (corresponding to a first loading state). The user execute the first registering operation to thereby causes the label printer 2 to receive first weight measuring data (corresponding to first data), in which the weight value corresponds to 0 (zero), from the weight measuring apparatus 3, and to store the first weight measuring data in the RAM, etc.

Figure 5:
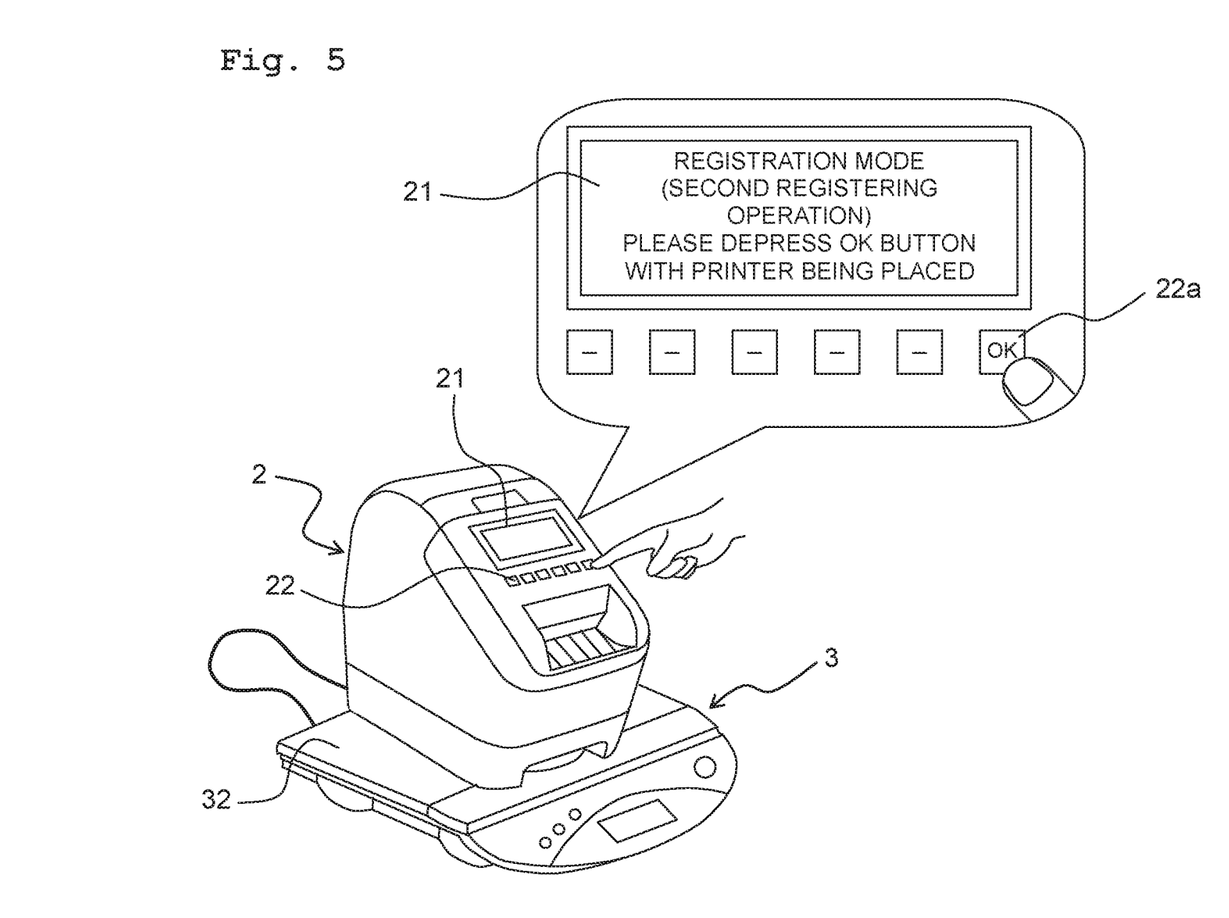
FIG. 5 is a view depicting the content of display by the display and the loading state when a second registering operation is performed.

Afterwards, as depicted in FIG. 5, the label printer 2 causes the display 21 to perform display (corresponding to a second display) such that the user executes a second registering operation (corresponding to a second operation). The second registering operation is an operation in which the operation part 22 (the OK button 22a in the depicted example) is depressed in a state that the label printer 2 itself is loaded on the loading plate 32 of the weight measuring apparatus 3 (corresponding to a second loading state). The user execute the second registering operation in the state that the entirety of the label printer 2 is actually loaded on the loading plate 32 of the weight measuring apparatus 3 to thereby causes the label printer 2 to receive second weight measuring data (corresponding to second data) which incudes, as a weight data part, the weight value of the label printer 2 at that time from the weight measuring apparatus 3, and to store the second weight measuring data in the RAM, etc.

Figure 6:
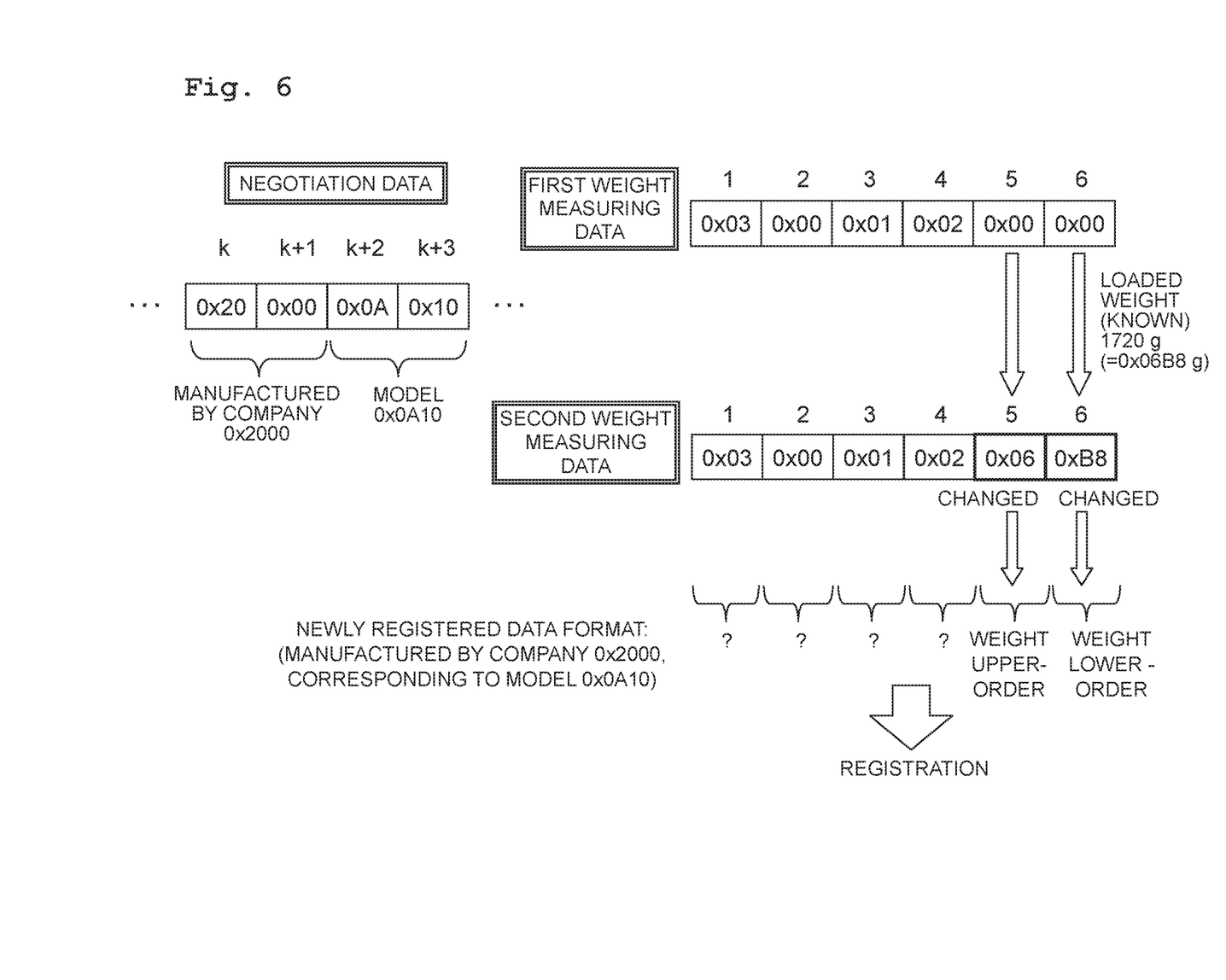
FIG. 6 is a view depicting interpretation of data format based on first weight measuring data and second weight measuring data, and registration thereof.

Then, the control circuit 23 execute a registering processing as depicted in FIG. 6, based on the weight measuring data received in each of the above-described registering processing performed twice in total. Namely, data areas (in the depicted example, 5th byte and 6th byte; see data areas surrounded by bold lines) which are different between the weight measuring data received at the time of the first registering operation and the weight measuring data received at the time of the second registering operation represent the difference in the states of the respective registering operations performed twice, namely, the weight of the label printer 2. Accordingly, data areas which are included in code strings constructing the first weight measuring data and the second weight measuring data, respectively, and which have mutually different values, are specified as weight data areas. Further, the weight data areas specified as described above are unique to the kind of the weight measuring apparatus 3 which is connected with respect to the label printer 2, the identification information (vendor ID and model ID) of the weight measuring apparatus 3 and the weight data areas are registered in the memory 24 as new data format information, while associating the identification information and the weight data areas with each other.

Note that the weight data areas in the depicted example span across 2 bytes, it is necessary to confirm as to which byte is weight upper-order information and which byte is weight lower-order information. In view of this, in the label printer 2 of the present embodiment, the weight of the label printer 2 itself is stored in advance, as known information, in the memory 24, etc. Further, in the label printer 2 of the present embodiment, the weight of the cartridge 52 which changes depending on the consumption amount of the tape 51 is also stored in the memory 24, etc., while managing the previous consumption amount of the tape so far. Accordingly, the content (weight value) in the weight data areas in th weight measuring data received in the second registering operation corresponds to the total weight of the body of the label printer 2 and the cartridge 52 depending on the tape consumption amount, namely the known loading weight. Accordingly, it is possible to analyze the content of the weight data areas based on this loading weight.

In the depicted example, the weight of the entirety of the label printer 2 including the cartridge 52 is 1,720 g which is converted as "0x 06B5" in hexadecimal. In contrast, "0x 06" is recorded in the 5th byte and "0×B8" is recorded in the 6th byte, as the weight data areas in the second weight measuring data; thus, it is possible to confirm that the 5th byte corresponds to the weight upper-order information and that the 6th byte corresponds to the weight lower-order information. Note that even in such a case that by any chance the weight of the entirety of the label printer 2 is, for example, "0 X 0202" in which the weight upper-order and the weight lower-order cannot be distinguished, the weight upper-order and the weight lower-order can be confirmed by, for example, a following method such as: consuming the tape 51 only in a slight amount; measuring the body of the label printer 2 in a state that the cartridge 52 is detached therefrom; measuring the weight only of the detached cartridge 52, rather than measuring the weight of the label printer 2; measuring a work (not specifically depicted in the drawings) of which weight is known and lighter than the value "0x 00FF" together with the label printer 2; and the like.

Further, even in a case that the values of the weight data areas in the second weight measuring data are not completely coincident with a known value of the loading weight, the difference in the values of the weight data areas between the first and second weight measuring data corresponds to the value of the loading weight. Thus, it is also possible to obtain a transformation by performing an appropriate analysis. Furthermore, minimally required information in the weight measuring data is the data regarding the weight value. Therefore, it does not present any problem if another or other information included in the weight measuring data (in the depicted example, information in each of the 1st to 4th bytes) were registered as being "unknown". Moreover, it is also possible to confirm the destination of the label printer 2 (area in which the label printer 2 is presumed to be used; for example, Japan, Great Britain, etc.) from destination information which is set and stored in advance in the memory 24 during manufacture of the label printer 2 in a factory. It is also allowable to determine the unit of the weight value (for example, "g" for Japan, "lb." for Great Britain, etc.) based on the confirmed destination information, and to perform the registration of the data format information, with the unit of the weight also being included therein. Alternatively, it is also allowable to determine the unit of the weight value based on the analysis of the above-described transformation.

In a case that the label printer 2 receives the negotiation data from a weight measuring apparatus 3 of the same kind (model), the data format information registered in the above-described manner is obtained corresponding to the vendor ID and the model ID included in the negotiation information. Further, the control circuit 23 refers to the obtained data format information, thereby making it possible to extract the weight data and the unit information from the received weight measuring data.

<Weight Information Outputting Processing>

In order to realize output of the weight information in the weight information outputting system 1 as described above, a control procedure of the weight information outputting processing (S100) which is executed by the control circuit 23 of the label printer 2 will be explained with reference to FIGS. 7A and 7B. The processing in FIGS. 7A and 7B is started, for example, in a case that a user performs an operation for instructing output of a measurement value from the weight measuring apparatus 3, after the label printer 2 has performed the negotiation communication with the weight measuring apparatus 3 and thus the state in which the transmittance and reception of the information is possible has been established.

In FIGS. 7A and 7B, at first in step S105, the control circuit 23 obtains the vendor ID and the model ID from the information of the negotiation data which has been previously received in the negotiation communication. Note that step S105 corresponds to the identifying processing and the information obtaining processing.

Next, the control circuit 23 proceeds to step S110 and receives the weight measuring data (abbreviated as "data" in the drawings) from the weight measuring apparatus 3 via the wired communication controlling section 25.

Next, the control circuit 23 proceeds to step S115 and determines whether or not the vendor ID and the model ID, obtained in step S105 as described above, have been already registered in the memory 24. In other words, the control circuit 23 determines whether or not the data format information corresponding to the obtained vendor ID and model ID has been registered in the memory 24. Note that step S115 corresponds to the determining processing.

In a case that the obtained vendor ID and model ID have not been already registered (S115: NO), the control circuit 23 executes the registration mode processing in step S200, returns to step S105 as described above, and repeats a similar procedure as those described above.

On the other hand, in a case that the obtained vendor ID and model ID have been already registered (S115: YES), and the control circuit 23 proceeds to step S120.

In step S120, the control circuit 23 obtains the data format information corresponding to each of the vendor ID and the model ID.

Next, the control circuit 23 proceeds to step S125, and extracts the information regarding the weight data and the information regarding the weight unit from the weight measuring data received in step S110 as described above, based on the data format information.

Next, the control circuit 23 proceeds to step S130 wherein the control circuit 23 determines as to whether the information regarding the weight data and the information regarding the weight unit extracted in step S125 are to be subjected to printed output, or to be subjected to display output. In other words, the control circuit 23 determines as to whether the weight data and the weight unit are to be printed on the tape 51 so as to produce a printed label by the label printer 2, or to cause the mobile terminal 4 to display the weight data and the weight unit. This determination may be executed by setting in advance by an operation from the user as to which one of the outputs is to be performed, or the determination may be made based on an operation from the user at that point of time. In a case that the printed output is to be performed, the control circuit 23 proceeds to step S135.

In step S135, the control circuit 23 controls the conveying device 28, the printing head 29 and the cutter 30 so as to print the weight data and the weight unit on the tape 51, thereby preparing a printed label. Then, the control circuit 23 ends this flow.

On the other hand, in a case that the determination is made in step S130 that the display output is to be performed, the control circuit 23 proceeds to step S140.

In step S140, the control circuit 23 transmits, to the mobile terminal 4 via the wireless communication controlling section 26, the information regarding the weight data and the information regarding the weight unit, and the control circuit 23 causes the display 23 of the mobile terminal 4 to display the above-described two pieces of the information. Then, the control circuit 23 ends this flow. Note that step S140 corresponds to the signal outputting processing.

<Registration Mode Processing>

Next, an explanation will be given about a control procedure of a registration mode processing S200 executed by the control circuit 23 of the label printer 2 so as to realize the above-described registration mode, with reference to FIGS. 8A and 8B.

In FIGS. 8A and 8B, at first in step S205, the control circuit 23 adds the weight of the label printer 2 itself and the weight of the cartridge 52 at the time of the adding which are known, so as to calculate the self-weight of the entire label printer 2.

Next, the control circuit 23 proceeds to step S210 wherein the control circuit 23 causes the display 21 to display such that an user executes the first registering operation (see FIG. 4). Note that step S210 corresponds to the first displaying processing.

Next, the control circuit 23 proceeds to step S215 wherein the control circuit 23 stands by until the OK button 22a of the operation part 22 is depressed by the user (S215: NO). In a case that the depression of the OK button 22a is detected (S215: YES), the control circuit 23 proceeds to step S220.

In step S220, the control circuit 23 receives the first weight measuring data from the weight measuring apparatus 3 via the wired communication controlling section 25, and stores the received first weight measuring data to the RAM, etc. Note that step S220 corresponds to the first storing processing.

Next, the control circuit 23 proceeds to step S225 wherein the control circuit 23 causes the display 21 to display such that the user executes the second registering processing (see FIG. 5). Note that step S225 corresponds to the second displaying processing.

Next, the control circuit 23 proceeds to step S230 wherein the control circuit 23 stands by until the OK button 22a of the operation part 22 is depressed by the user (S230: NO). In a case that the depression of the OK button 22a is detected (S230: YES), the control circuit 23 proceeds to step S235.

In step S235, the control unit 23 receives the second weight measuring data from the weight measuring apparatus 3 via the wired communication controlling section 25, and stores the received second weight measuring data to the RAM, etc. Note that step S235 corresponds to the second storing processing.

Next, the control circuit 23 proceeds to step S240 wherein the control unit 23 identifies, as the weight data areas, data areas of which contents are different between the first weight measuring data received in step S220 (abbreviated in the figure as the "first data") and the second weight measuring data received in step S235 (abbreviated in the figure as the "second data"). Note that step S240 corresponds to the data specifying processing.

Next, the control circuit 23 proceeds to step S245 wherein the control circuit 23 analyses the data format (the upper and lower orders, the transformation, etc.) of the weight measuring data, based on the comparison between the value of the weight data areas in the second weight measuring data and the self-weight of the label printer 2 calculated in step S205.

Next, the control circuit 23 proceeds to step S250 wherein the control circuit 23 confirms the destination of the label printer 2 based on the destination information stored in the memory 24, and determines the weight unit corresponding to the destination. Note that step S250 corresponds to the unit determining processing.

Next, the control circuit 23 proceeds to step S255 wherein the control circuit 23 newly registers, in the memory 24, the data format analyzed in step S245 and the weight unit determined in step S250 as the data format information corresponding to each of the IDs (namely, the vendor ID and the model ID). Then, the control circuit 23 ends this flow. Note that step S255 corresponds to the registering processing.

[Effect of Embodiment]

As explained above, parts or portions which are different between the first weight measuring data corresponding to the loading state at the time of the first registering operation and the second weight measuring data corresponding to the loading state at the time of the second registering operation represent the weight of the label printer 2 as a whole. Accordingly, in the label printer 2 of the present embodiment, data areas which are included in code strings constructing the first weight measuring data and the second weight measuring data, respectively, the data areas having values which are mutually different, are specified as the weight data areas. Further, the weight data areas specified as described above are unique to the kind of the weight measuring apparatus 3 which is connected with respect to the label printer 2 at this time. Therefore, the vendor ID and model ID of the weight measuring apparatus 3 and the data format information indicating the weight data areas are registered while being associated with each other.

With this, in a case that the weight measuring apparatus 3 of the above-described kind is connected with respect to the label printer 2 thereafter, the label printer 2 is capable of obtaining the weight value of the measurement object by appropriately interpreting the data of the weight data areas (weight data) included in the weight measuring data inputted to the label printer 2 from the weight measuring apparatus 3. As a result, the label printer 2 is capable of performing, in an ensured manner, a desired printing even with respect to the weight value measured by a non-registered weight measuring apparatus 3.

Further, in the present embodiment, the above-described message (see FIG. 4) is displayed in the display 21 in step S210 as described above, and the user performs the first registration operation based on the message in a state that nothing is loaded in the weight measuring apparatus 3. With this, in step S220, it is possible to store, in an ensured manner, the first weight measuring data outputted from the weight measuring apparatus 3 in the state that nothing is loaded thereon.

Further, in the present embodiment, the weight of the label printer 2 (or the weight of the cartridge 52 used in the label printer 2) which is previously known and is a unique value to the label printer 2 is used as the weight to be measured in a case that the second registration operation is performed. Namely, the state at a time of execution of the second registering operation is a state in which the weight is increased, from the loading state in the first registering operation, by the weight of the label printer 2 (or the weight of the cartridge 52). With this, in a case that the user places the label printer 2 (or the cartridge 52) on the weight measuring apparatus 3 in the loading state at the time of the first registering operation (the state having nothing loaded), it is possible to thereby easily realize the loading state at the time of execution of the second registering operation.

Note that it is allowable that the state in which the label printer 2 is loaded on the weight measuring apparats state 3 is provided at the time of the first registering operation, and that the state in which anything is not loaded on the weight measuring apparats state 3 is provided at the time of the second registering operation. Namely, the loading state at the time of the second registering operation is a state in which the weight is decreased, from the state of the first registering operation, by the weight of the label printer 2 (or the weight of the cartridge 52). In this case also, it is possible to specify the weight data areas included in the weight measuring data, by performing comparison between the first and second weight measuring data.

Furthermore, in the present embodiment, the message (see FIG. 5) is displayed in the display 21 in step S225 as described above, and the user performs the second registration operation based on the message in a state that the label printer 2 (or the cartridge 52) is loaded (placed) in the weight measuring apparatus 3. With this, in step S235, it is possible to store, in an ensured manner, the second weight measuring data outputted from the weight measuring apparatus 3 in the state that the label printer 2 (or the cartridge 52) is loaded thereon.

Moreover, in the present embodiment, the determination is made as to whether or not the vendor ID and the model ID obtained in step S105 as described above have been already registered (step S115). Further, in a case that the respective IDs are determined to have been already registered, the content of the weight data areas included in the weight measuring data transmitted from the connected weight measuring apparatus 3 is interpreted and a signal including the weight data corresponding to the measured weight is outputted to the mobile terminal 4 (step S140). With this, in a case that a certain weight measuring apparatus 3 is connected to the label printer 2, and that the certain weight measuring apparatus 3 has been already registered, it is possible to automatically interpret the data outputted from the certain weight measuring apparatus 3, to thereby obtain a weight data corresponding to the outputted data, and to output a signal including the obtained weight data.

Further, in the present embodiment, the destination information which is previously set with respect to the label printer 2 is obtained, and the weight unit corresponding thereto is determined based on the destination information (step S250). Further, a signal in which the determined weight unit is added with respect to the weight value is outputted (step S140). With this, in a case that a registered weight measuring apparatus 3 is connected to the label printer 3 and that the signal is to be outputted as described above, it is possible to output the signal in a form in which the information indicating the weight unit corresponding to the destination of the label printer 2 (for example, "g: gram" in the apparatus destined for Japan, "lb.: pound" in the apparatus destined for Great Britain) is added.

Further, in the above description, the arrows indicated in FIG. 2, etc., indicate an example of a flow of a signal, and not are intended to restrict or limit the direction in which the signal flows.

Furthermore, the flowcharts indicated in FIGS. 7 and 8 are not intended to limit or restrict the present disclosure to the procedures of the flows indicated in these figures. It is allowable to make any addition and/or deletion in the procedure or to change the order in the procedure, within a range not departing from the gist and/or sprit and the technical idea of the present disclosure.

Moreover, it is allowable to use the method of the embodiment and the method in the respective modifications in a combined manner, in addition to those already described above.

Other than those described above, though not exemplified, the present disclosure may be realized by adding a variety of kinds of changes thereto, within a range not departing from the gist and/or sprit of the present disclosure.

What is claimed is:

1. A printer connectable to a weight measuring apparatus, the weight measuring apparatus being configured to measure weight of a measurement object and to output data including weight data corresponding to the measured weight, the printer comprising:
   a head configured to perform printing on a print medium;
   a controller;
   a memory; and
   an operation part,
   wherein the controller is configure to execute:
   an identifying processing of obtaining identification information from the weight measuring apparatus to which the printer is connected, and of identifying the weight measuring apparatus to which the printer is connected, based on the identification information,
   a first storing processing of storing, in the memory, first data transmitted from the weight measuring apparatus in a first loading state, the first loading state being a state before a first operation is performed with respect to the operation part;
   a second storing processing of storing, in the memory, second data transmitted from the weight measuring apparatus in a second loading state, the second loading state being a state having a gain or loss of a predetermined weight from the first loading state after the first operation has been performed with respect to the operation part;
   a data specifying processing of specifying, as weight data areas, data areas which are included in code strings constructing the first data and the second data, respectively, and which have mutually different values; and
   a registering processing of registering, in the memory, the identification information obtained in the identifying processing and the weight data areas specified in the data specifying processing while associating the identification information and the weight data areas with each other.

2. The printer according to claim 1, further comprising a display,
   wherein the controller is configured to further execute:
   a first displaying processing of controlling the display to display a first message, the first message urging the first operation to be performed in a state that nothing is loaded on the weight measuring apparatus, and the first loading state being the state that nothing is loaded on the weight measuring apparatus, and
   in the first storing processing, the controller is configured to store, in the memory, the first data based on the first operation performed with respect to the operation part.

3. The printer according to claim 2, wherein the predetermined weight is weight of the printer or weight of the print medium usable in the printer.

4. The printer according to claim 3, wherein the controller is configured to further execute:
   a second displaying processing of controlling the display to display a second message, the second message urging a second operation to be performed in a state that the printer or the print medium is loaded on the weight measuring apparatus, and the second loading state being the state that the printer or the print medium is loaded on the weight measuring apparatus; and
   in the second storing processing, the controller is configured to store, in the memory, the second data based on the second operation performed with respect to the operation part.

5. The printer according to claim 1, wherein the controller is further configured to execute:
   a determining processing of determining whether the identification information obtained in the identifying processing has been already registered in the memory; and
   a signal outputting processing of interpreting a content of the weight data areas included in the data transmitted from the weight measuring apparatus to which the printer is connected, and of outputting a weight signal including weight data corresponding to the measured weight, based on determining in the determining processing that the identification information has been already registered in the memory.

6. The printer according to claim 5, wherein the controller is configured to further execute:
   an information obtaining processing of obtaining destination information which is previously set with respect to the printer, and
   a unit determining processing of determining a weight unit, based on the destination information obtained in the information obtaining processing, the weight unit corresponding to the destination information; and
   in the signal outputting processing, the controller is configured to output the weight signal in which the weight unit determined in the unit determining processing is added to a value of the measured weight.

* * * * *